United States Patent
Murray et al.

(10) Patent No.: US 9,382,013 B2
(45) Date of Patent: Jul. 5, 2016

(54) VARIABLY EXTENDING HEAT TRANSFER DEVICES

(75) Inventors: Thomas M. Murray, Sandy, UT (US); Edward Zielinski, Kent, WA (US)

(73) Assignee: The Boeing Company, Chicago, IL (US)

( * ) Notice: Subject to any disclaimer, the term of this patent is extended or adjusted under 35 U.S.C. 154(b) by 801 days.

(21) Appl. No.: 13/289,307

(22) Filed: Nov. 4, 2011

(65) Prior Publication Data

US 2013/0112374 A1    May 9, 2013

(51) Int. Cl.
*F28F 27/00*  (2006.01)
*B64D 33/12*  (2006.01)
*B64G 1/50*   (2006.01)

(52) U.S. Cl.
CPC .............. *B64D 33/12* (2013.01); *B64G 1/506* (2013.01)

(58) Field of Classification Search
CPC . F28D 15/06; F28D 15/0233; F28D 15/0266; F28D 15/0258; F28D 15/0208; F28D 2021/0021
USPC ......... 165/11.1, 96, 272–276, 104.21–104.32
See application file for complete search history.

(56) References Cited

U.S. PATENT DOCUMENTS

| | | | |
|---|---|---|---|
| 3,402,761 A | | 9/1968 | Swet |
| 3,517,730 A | * | 6/1970 | Wyatt ............................ 165/272 |
| 4,727,932 A | * | 3/1988 | Mahefkey ....................... 165/41 |
| 4,941,526 A | * | 7/1990 | Nilsson ......................... 165/274 |
| 6,990,797 B2 | | 1/2006 | Venkataramani et al. |
| 7,434,765 B2 | | 10/2008 | Zielinski et al. |
| 7,845,159 B2 | | 12/2010 | Venkataramani et al. |
| 7,883,053 B2 | | 2/2011 | Zielinski et al. |
| 7,900,437 B2 | | 3/2011 | Venkataramani et al. |
| 8,024,936 B2 | | 9/2011 | Storm et al. |
| 2006/0086482 A1 | * | 4/2006 | Thayer et al. ............ 165/104.26 |
| 2008/0087406 A1 | | 4/2008 | Asfia et al. |
| 2008/0121389 A1 | | 5/2008 | Zillmer |
| 2008/0250792 A1 | | 10/2008 | Wang et al. |
| 2008/0307651 A1 | | 12/2008 | Zhao et al. |
| 2010/0051254 A1 | | 3/2010 | Ipposhi et al. |
| 2010/0054926 A1 | | 3/2010 | Zhang et al. |
| 2010/0133813 A1 | | 6/2010 | Cote et al. |
| 2010/0300654 A1 | * | 12/2010 | Edwards .................. 165/104.26 |

FOREIGN PATENT DOCUMENTS

DE              327077 C      10/1920

OTHER PUBLICATIONS

European Search Report in European Application No. 12 18 6025 mailed Feb. 13, 2013.

* cited by examiner

*Primary Examiner* — Travis Ruby
(74) *Attorney, Agent, or Firm* — Armstrong Teasdale LLP

(57) ABSTRACT

A heat transfer device for installation in a system having a heat generating element within the system away from which heat is to be transferred is described. The heat transfer device includes a heat pipe having a first portion, a second portion, and a working fluid contained within the heat pipe for transferring heat from the first portion to the second portion. The first portion is disposed in proximity with the heat generating element. The second portion is coupled to the first portion. At least part of the second portion is disposed outside the system to dissipate heat from the heat generating element and the second portion may be variably extended outside the system.

16 Claims, 8 Drawing Sheets

VARIABLY EXTENDING HEAT TRANSFER DEVICES

BACKGROUND

The field of the disclosure relates generally to heat transfer devices and, more specifically, to closed loop heat transfer devices and variable area heat transfer devices.

Some existing aircraft include multiple turbofan engines, each coupled to a starter/generator. The starter/generator is used both to start the turbofan engine and extract electrical power from the turbofan engine once the turbofan engine is started. The extracted electrical power is then routed to electrical systems on the aircraft.

Existing starter/generators create heat that must be dissipated to prevent overheating and subsequent system failure. Some aircraft utilize an air-cooled oil cooler (i.e., a heat exchanger) designed for this purpose. The heat exchanger receives hot cooling oil from the starter/generator via a hot oil supply, and returns cooled oil to the starter/generator via a cool oil return. Within the heat exchanger, cold air cools the initially hot oil. The cold air can be received from a cold air supply, which is coupled to an air source, for example, an air scoop located behind the fan of the turbofan engine. A warm air return returns air warmed by the oil, for example, by reintroducing the air to the fan flow, or by dumping the air overboard the aircraft. Other aircraft transfer heat from hot cooling oil to another, cooler fluid such as, for example, a cooling fluid or engine fuel. Some of these known systems are relatively large and/or heavy and may increase the weight of the aircraft in which they are used.

BRIEF DESCRIPTION

In one example, a heat transfer device is described. The heat transfer device includes a thermally conductive pipe and a heat transfer element slidably coupled to the thermally conductive pipe. The thermally conductive pipe and the heat transfer element collaboratively define a length of the heat transfer device. The heat transfer element is movable between a first position at which the length of the heat transfer device is a minimum and a second position at which the length of the heat transfer device is a maximum. A cavity for containing a working fluid is at least partially defined by the thermally conductive pipe.

Another exemplary heat transfer device includes a closed loop fluid conduit defining an inner cavity, a working fluid disposed within the inner cavity, and an orifice disposed within the inner cavity. The orifice is configured to control a flow of vaporized working fluid around said closed loop fluid conduit.

In yet another example, a heat transfer device for installation in a system having a heat generating element within the system away from which heat is to be transferred is described. The heat transfer device includes a heat pipe having a first portion, a second portion, and a working fluid contained within the heat pipe for transferring heat from the first portion to the second portion. The first portion is disposed in proximity with the heat generating element. The second portion is coupled to the first portion. At least part of the second portion is disposed outside the system to dissipate heat from the hot element.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
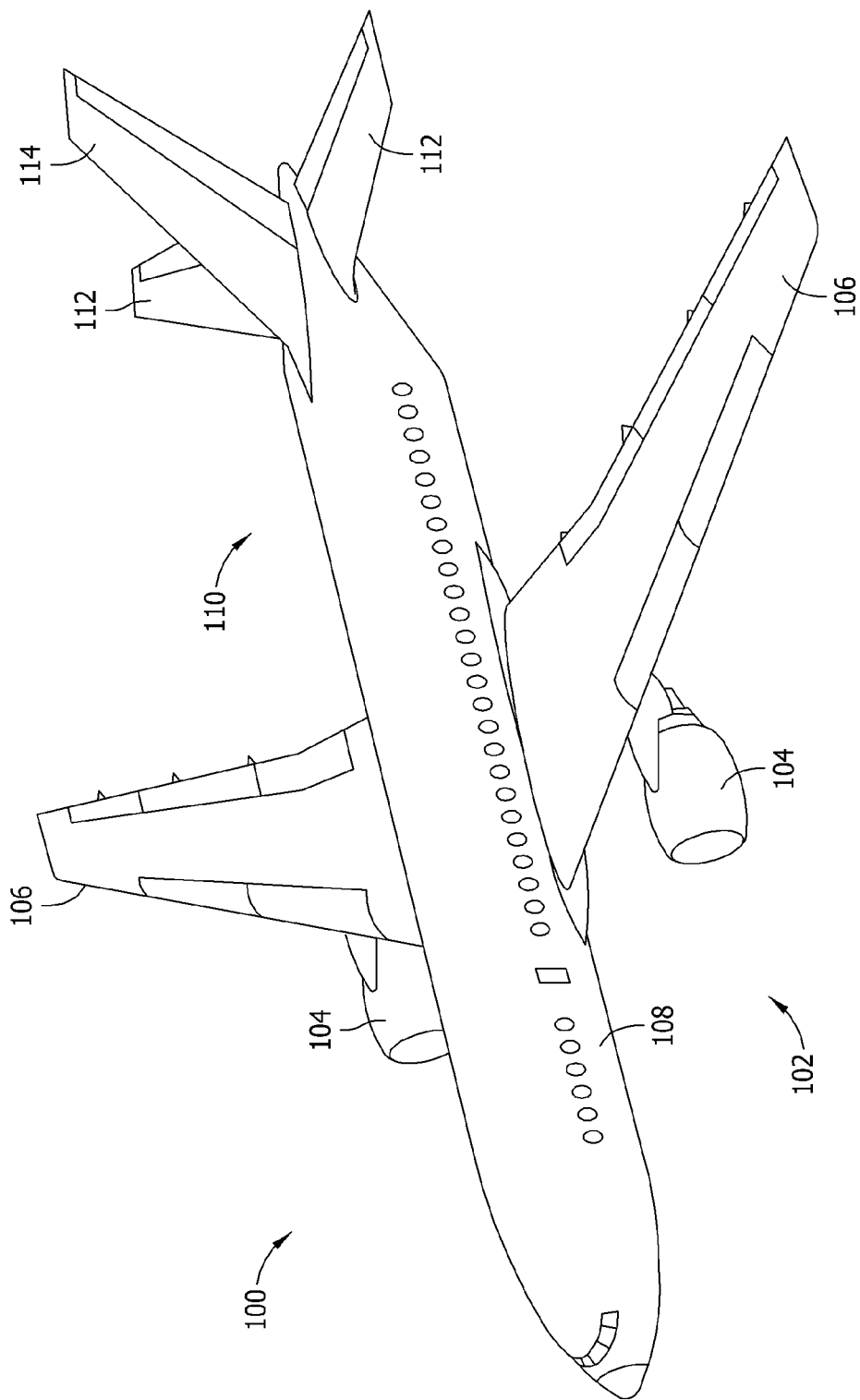
FIG. 1 is an isometric illustration of an aircraft that can house a heat transfer device in accordance with an embodiment of the invention.

FIG. 1 illustrates an aircraft 100 having heat generating and/or hot components that are cooled with exemplary heat transfer devices (not shown in FIG. 1) of this disclosure. In the exemplary embodiment, aircraft 100 has a propulsion system 102 coupled to one or more starter/generators (not shown in FIG. 1) that are cooled by exemplary heat transfer devices. In other embodiments, exemplary heat transfer devices are used to cool other heat generating or hot components such as, for example, hydraulic pumps, engine oil, liquid coolant, electronic equipment, etc. Propulsion system 102 includes two turbofan engines 104. Other embodiments may include more or fewer engines 104. Moreover, some embodiments may include other and/or different motors, engines, etc. In the particular embodiment shown in FIG. 1, engines 104 are carried by wings 106 of aircraft 100. In other embodiments, engines 104 can be carried by fuselage 108 and/or empennage 110. Empennage 110 also includes horizontal stabilizers 112 and a vertical stabilizer 114.

Figure 2:
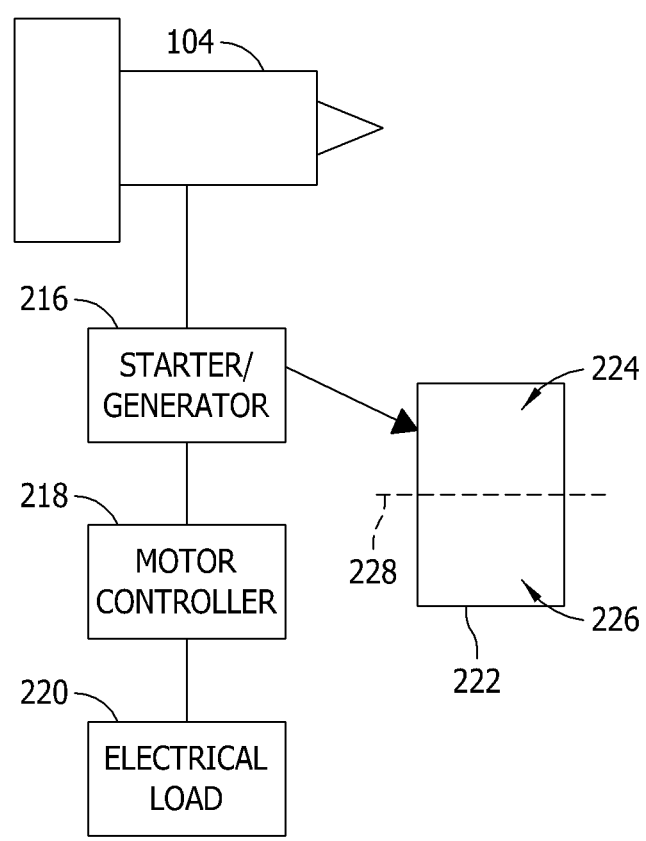
FIG. 2 is a schematic illustration of an aircraft engine coupled to a starter/generator, and an associated heat transfer device configured in accordance with an embodiment of the invention.

FIG. 2 is a schematic illustration of one of engines 104 described above with reference to FIG. 1. In the exemplary embodiment, engine 104 is coupled to a starter/generator 216. In other embodiments, engine 104 may be coupled to more than one starter generator 216. Starter/generator 216 is coupled to a motor controller 218 that is coupled to a corresponding electrical load 220. Electrical load 220 can include electric actuators, flight deck computers and displays, fans, motors, and/or other electrically powered aircraft equipment.

Starter/generator 216 is coupled to a heat transfer device 222 for cooling. In the exemplary embodiment, heat is indirectly removed from starter/generator 216 by heat transfer device 222. A cooling fluid (e.g., an oil) removes heat from starter/generator 216 and is conducted from starter/generator 216 to a location in thermal communication with heat transfer device 222, which removes heat from the cooling fluid. In other embodiments, heat transfer device 222 is positioned to be thermally coupled with one or more heat generating and/or hot portion of starter/generator 216, such as by being in contact or proximate starter/generator 216. Heat is removed generally directly from starter/generator 216 via heat transfer device 222 to cool starter/generator 216. In some embodiments, heat transfer device 222 is thermally coupled to and/or within a heat exchanger (not shown). The heat exchanger is thermally coupled with starter/generator 216, such as via contact with starter/generator 216, conductance of cooling fluid from starter/generator 216 to heat exchanger, etc.

The exemplary heat transfer device 222 includes a first portion generally designated as a "hot" or "evaporator" portion 224 of heat transfer device 222. The hot portion 224 of heat transfer device 222 is configured for positioning in areas of relatively high temperature to absorb heat from the areas of relatively high temperature. Heat transfer device 222, includes a second portion generally designated as a "cool", "radiator" or "condenser" portion 226. Cool portion 226 is configured for positioning in areas of relatively low temperature to transfer the heat absorbed by hot portion 224 to the area of relatively low temperature. In the exemplary embodiment, hot portion 224 is positioned within aircraft 100 adjacent starter/generator 216, and cool portion 226 is positioned outside of aircraft 100 to discharge heat received from starter/generator 216 to the air outside aircraft 100. Boundary 228 approximates a boundary between an interior of aircraft 100 and an exterior of aircraft 100.

Figure 3:
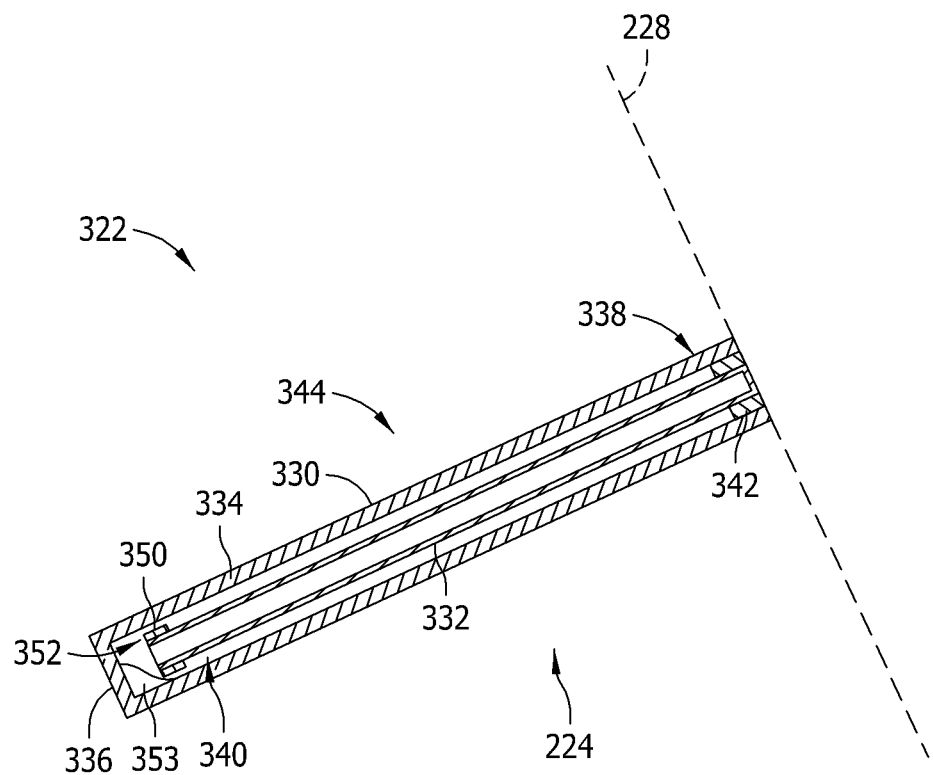
FIG. 3 is a cross-sectional view of an exemplary heat transfer device in a retracted configuration.
Figure 4:
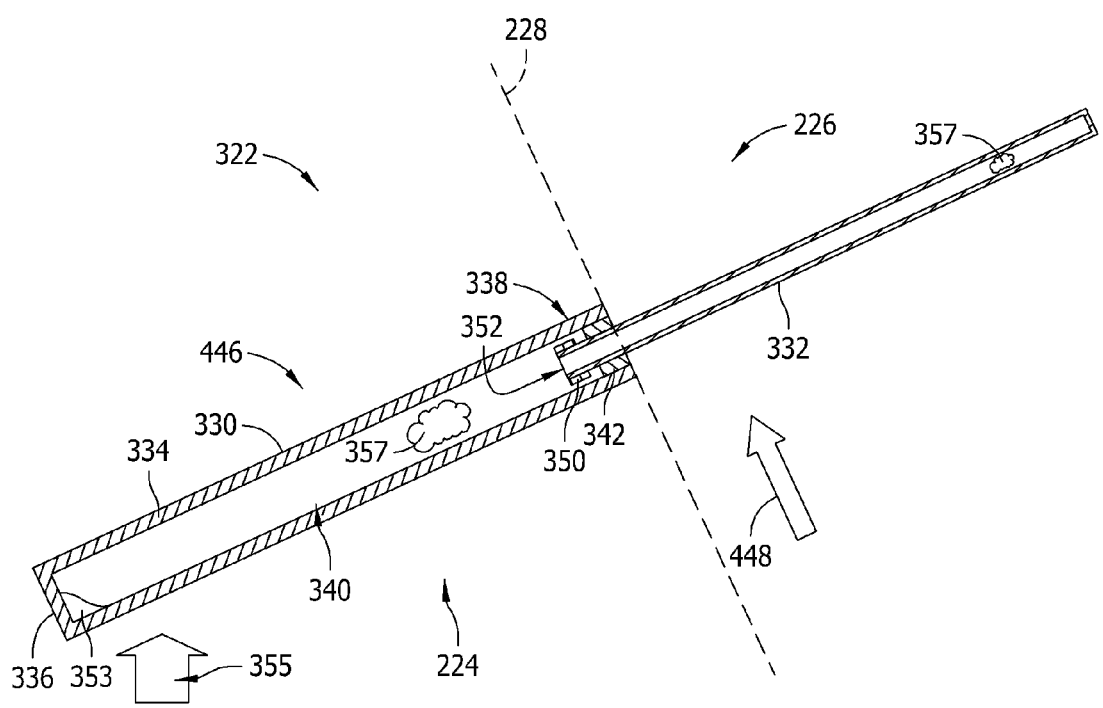
FIG. 4 is a cross-sectional view of the heat transfer device shown in FIG. 2 in an extended configuration.
Figure 5:
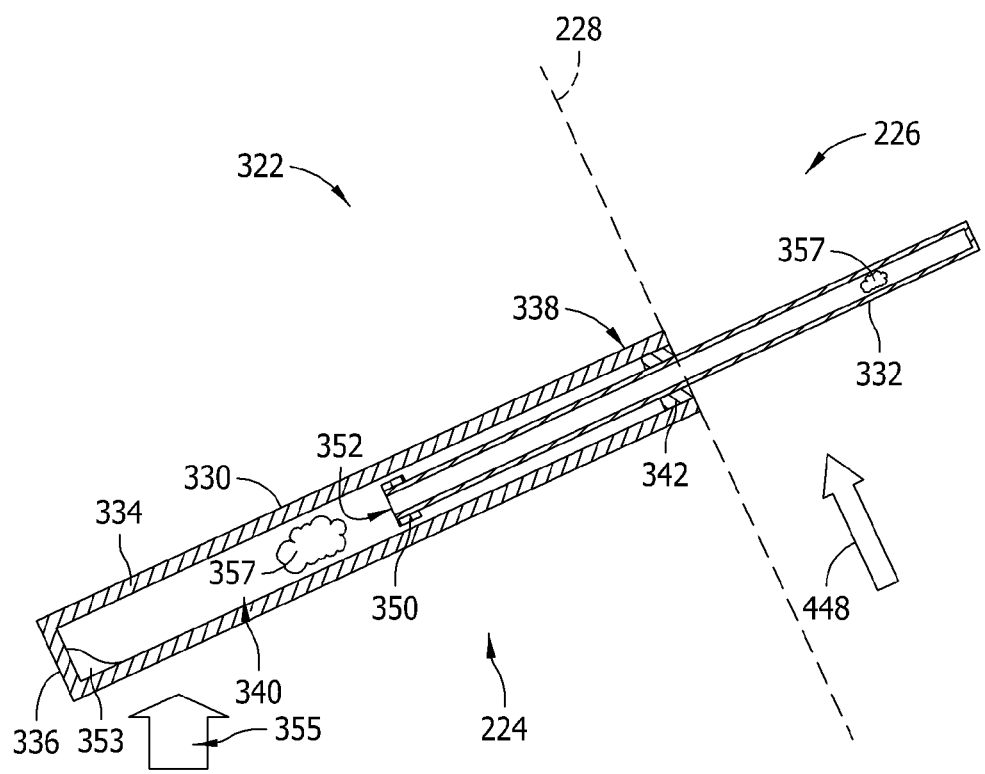
FIG. 5 is a cross-sectional view of the heat transfer device shown in FIG. 2 in-between the retracted and extended configurations.

FIGS. 3-5 are illustrations of an exemplary heat transfer device 322 that may be used, for example, in aircraft 100. Heat transfer device 322 comprises a variable area heat pipe. Heat transfer device 322 includes a first pipe 330 positioned within aircraft 100 and a second pipe 332 coupled to first pipe 330. First pipe 330 has an elongated outer wall 334, a closed end 336, and an open end 338. A cavity 340 is generally defined by first pipe 330. Second pipe 332 is coupled via a seal 342 to first pipe 330 at least partially within cavity 340. Seal 342 and second pipe 332 substantially close open end 338 to substantially seal cavity 340. In the exemplary embodiment, seal 342 comprises one or more o-ring seals. In other embodiments, any other suitable seal may be used.

In the exemplary embodiment, second pipe 332 is moveable with respect to first pipe 330 to vary the length (and accordingly, the area) of heat transfer device 322 to thereby vary the amount of heat transferred by heat transfer device 322. In FIG. 3, second pipe 332 is in a first position 344 (sometimes referred to as a retracted position) relative to first pipe 330 and heat transfer device 322 has its shortest length. When second pipe 332 is in first position 344, second pipe 332 is contained completely within cavity 340 and is generally within aircraft 100. Second pipe 332 is maintained in first position 344 when little or no heat transfer is desired. Second pipe 332 is shown extended to a second position 446 (sometimes referred to as an extended position) relative to first pipe 330 and heat transfer device 322 is at its longest length in FIG. 4. When second pipe 332 is in second position 446, second pipe 332 extends out of cavity 340. Moreover, most of second pipe 332 extends outside of aircraft 100, thus exposing most of the surface area of second pipe 332 to the atmosphere external to aircraft 100, which is generally cooler than the interior of aircraft 100 near starter/generator 216. Thus, heat may be transferred from the interior of aircraft 100 and released via second pipe 332 outside of aircraft 100. Moreover, when aircraft 100 is moving, air flows across second pipe 332 in airflow direction 448 increasing the release of heat from second pipe 332. Second pipe 332 is generally maintained in second position 446 when a maximum heat transfer is desired. In FIG. 5, second pipe 332 is between first position 344 and second position 446. When second pipe 332 is extended to a position between first position 344 and second position 446, the amount of heat transferred by heat transfer device 322 is intermediate between the maximum amount of heat transfer (when in second position 446) and the minimum amount of heat transfer (when in first position 344). Thus, second pipe 332 may be varied to any extension between and including first position 344 and second position 446 to correspondingly vary the amount of heat transferred by heat transfer device 322.

Second pipe 332 includes a stop 350 coupled about second pipe 332 at an end 352 near closed end 336 of first pipe 330 when in first position 344 (shown in FIG. 3). Stop 350 facilitates preventing second pipe 332 from extending out of first pipe 330 beyond second position 446. More particularly, in the exemplary embodiment, stop 350 contacts seal 342 to prevent further extension of second pipe 332. In other embodiments, seal 342 may contact a complementary stop coupled to second pipe 330 within cavity 340.

A working fluid 353 is disposed within cavity 340. Various working fluids, such as alcohols, gases, water, organic substances, and low-melting point metals are known for use in heat pipes. Working fluid 353 may be any suitable known working fluid. In some embodiments, working fluid 353 is non-flammable so as to avoid introducing a fire hazard in the event of a leak or break in the heat transfer device 322. In some embodiments, working fluid 353 comprises methanol. In some other embodiments, working fluid 353 comprises octanol.

In operation, heat 355 (not shown in FIG. 3) from starter/generator 216 is transferred to first pipe 330, such as via conduction, convection, etc. near closed end 336. Working fluid 353 in first pipe 330 absorbs heat from first pipe 330. When enough heat is absorbed, with the amount being dependent on the particular working fluid selected, working fluid 353 vaporizes. Vaporized working fluid 357 (sometimes referred to herein as vapor 357) generally travels toward cool portion 226. Heat from vapor 357 is absorbed by second pipe 332 and convected to the atmosphere external to aircraft 100. As vapor 357 loses heat to second pipe 332 via heat transfer to the cooler external air, vapor 357 condenses and travels back toward closed end 336 of first pipe 330. In some embodiments, second pipe 332 functions as a wick on which vapor 357 condenses and travels back toward closed end 336.

Moreover, the exemplary heat transfer device 322 may be configured to automatically vary the length, and thereby the surface area, of heat transfer device 322 as a function of the amount of heat being transferred to first pipe 330. As described above, seal 342 and second pipe 332 substantially seal cavity 340. When heat transfer device 322 is assembled, the sealed cavity may be configured to maintain a predetermined internal pressure. In one embodiment, the internal pressure may be approximately the same or less than atmospheric pressure outside heat transfer device 322 when second pipe 332 is retracted. Thus, second pipe 332 will tend to remain in first position 344. When heat is transferred to first pipe 330 and working fluid 353 begins to vaporize, the pressure within cavity 340 increases. The increased pressure, relative to atmospheric pressure outside heat transfer device 322, forces second pipe 332 to extend out of first pipe 330 toward second position 446 until the pressure within cavity 340 is approximately equal to the atmospheric pressure outside of heat transfer device 322. Thus, when relatively little heat is being absorbed by first pipe 330, and relatively little heat needs to be dissipated by heat transfer device 322, the pressure in cavity 340 will be relatively low and will extend second pipe 332 only part of the distance from first position 344 toward second position 446. When greater amounts of heat are being absorbed by first pipe 330, and relatively greater heat needs to be dissipated by heat transfer device 322, the pressure in cavity 340 will be higher and will extend second pipe 332 a greater distance from first position 344 up to and including extension to second position 446. As lesser heat transfer is needed, whether due to decrease in heat transferred to first pipe 330, effectiveness of heat transfer device 330, changing environmental conditions, etc., vapor pressure within cavity 340 will decrease, causing second pipe 332 to retract into first pipe 330 proportionally. Accordingly, in the exemplary embodiment, heat transfer device 322 automatically extends and retracts second pipe 332 thereby increasing and decreasing, respectively, the area of second pipe 332 exposed to cooler external air. Thus, heat transfer device 322 automatically regulates heat transfer via heat transfer device 322.

The heat transfer characteristics of heat transfer device 322 may be varied depending on the desired use of heat transfer device 322. For example, the materials from which first pipe 330 and second pipe 332 are manufactured may be varied to vary the heat transfer characteristics to suit a particular use. For example, a more thermally conductive material may be used in situations in which greater heat transfer is desired. The selection of materials may, however, also be constrained by other design considerations including, for example, weight considerations, strength considerations, etc. Working fluid 353 may also be varied to vary the characteristics of heat transfer device 322. For example, a fluid with a lower boiling point (e.g., methanol) will vaporize at a lower temperature than a fluid with a higher boiling point (e.g., octanol). The fluid with the lower boiling point will increase pressure in cavity 340 at a lower temperature than the fluid with a higher boiling point, thus extending second pipe 332 and thereby increasing heat transfer by device 322 at a lower temperature than the fluid with a higher temperature boiling point. Accordingly, working fluid may be selected to cause cooling initiation at various desired temperatures.

Figure 6:
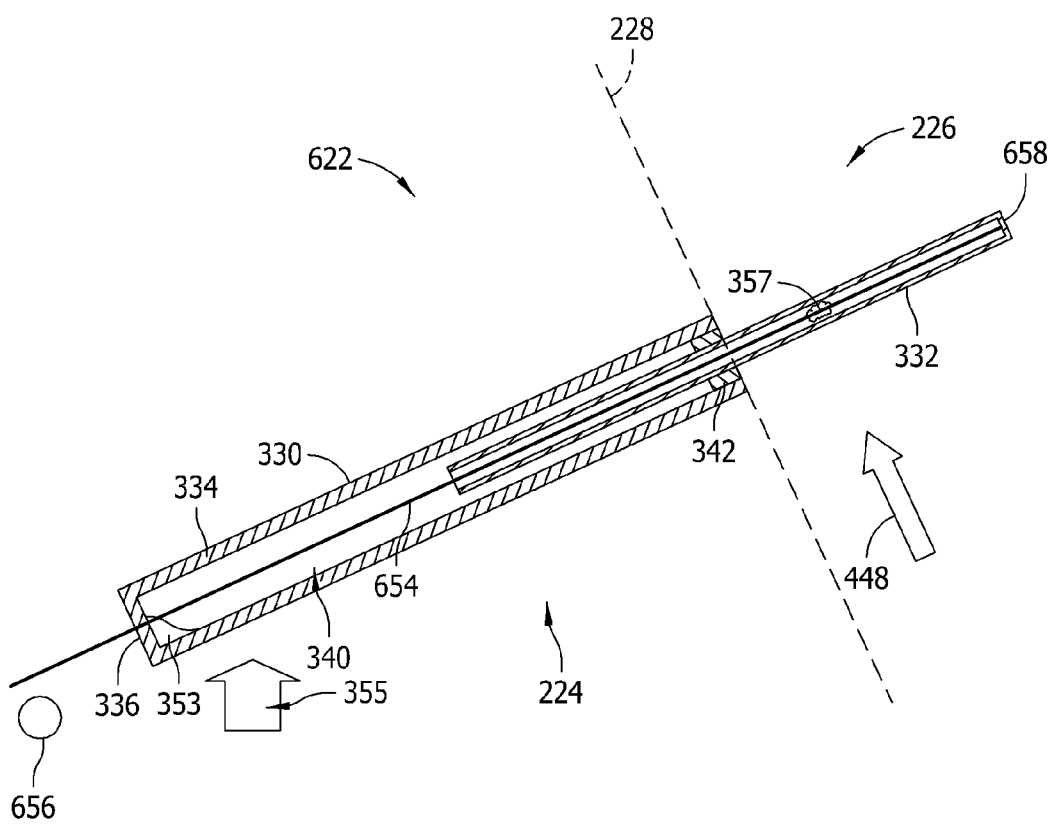
FIG. 6 is a cross-sectional view of another exemplary heat transfer device in-between retracted and extended configurations.

FIG. 6 is an illustration of another exemplary embodiment of a heat transfer device 622. Heat transfer device 622 is similar to heat transfer device 322 and common elements are indicated by the same reference numbers. Heat transfer device 622 primarily differs from heat transfer device 322 by not automatically extending and/or retracting second pipe 332. Heat transfer device 622 includes a driving rod 654 coupled to second pipe 332, and an actuator 656 coupled to driving rod 654. In the exemplary embodiment, driving rod 654 extends through second rod 332 to an end 658 opposite first pipe closed end 336. Actuator 656 is configured to selectively drive rod 654 along its longitudinal direction to extend and retract second pipe 332 to vary the length of heat transfer device 622. Increasing the length of heat transfer device 622 increases the area of second pipe 332 exposed to airflow 448 and correspondingly increases the heat transfer by heat transfer device 622. Conversely, decreasing the length of heat transfer device 622 decreases the area of second pipe 332 exposed to airflow 448 and correspondingly decreases the heat transfer by heat transfer device 622. Moreover, actuator 656 pushes driving rod 654 toward the exterior of aircraft 100 to extend second pipe 332 and pulls driving rod 654 toward the interior of aircraft 100 to retract second pipe 332.

Like heat transfer device 322, heat transfer device 622 includes a working fluid captured within cavity 340. Heat transfer through heat transfer device 622 occurs in generally the same way as with heat transfer device 322. In heat transfer device 622, push rod 654 operates as a wick on which vaporized working fluid condenses and travels back toward closed end 336. Because heat transfer device 622 is not automatically operated by vapor pressure, working fluid 353 may selected based on other desired properties with little, or no, consideration of the affect of working fluid vapor pressure on extension and retraction of second pipe 332. For example, a thicker working fluid may be selected to facilitate preventing leakage from heat transfer device 622.

Figure 7:
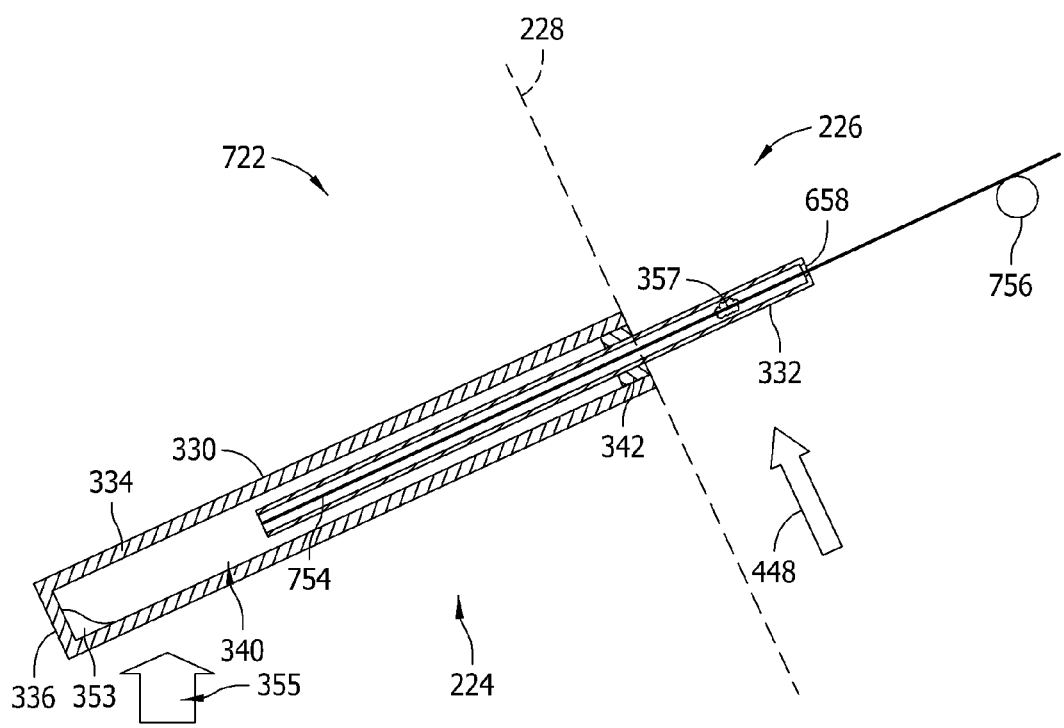
FIG. 7 is a cross-sectional view of another exemplary heat transfer device in-between retracted and extended configurations.

FIG. 7 is a simplified cross-sectional illustration of another exemplary embodiment of a heat transfer device 722. Heat transfer device 722 is similar to heat transfer devices 322 and 622, and common elements are indicated by the same reference numbers. Heat transfer device 722 includes a driving rod 754 coupled to second pipe 332, and an actuator 756 coupled to driving rod 754. In the exemplary embodiment, actuator 756 is positioned outside of outside of aircraft 100. In other embodiments, actuator may be located within aircraft 100, but in a different portion of aircraft 100 from first pipe 330. Actuator 756 is configured to selectively drive rod 754 along its longitudinal direction to extend and retract second pipe 332 to vary the length of heat transfer device 722. Moreover, actuator 756 pulls driving rod 754 toward the exterior of aircraft 100 to extend second pipe 332 and pushes driving rod 754 toward the interior of aircraft 100 to retract second pipe 332.

Like heat transfer devices 322 and 622, heat transfer device 722 includes a working fluid captured within cavity 340. Heat transfer through heat transfer device 722 occurs in generally the same way as with heat transfer devices 322 and 722. Because heat transfer device 722 is operated by driving rod 754 and actuator 756 rather than by vapor pressure, working fluid 353 may be selected based on other desired properties with little, or no, consideration of the affect of working fluid vapor pressure on extension and retraction of second pipe 332. For example, a thicker working fluid may be selected to facilitate preventing leakage from heat transfer device 722.

The exemplary heat transfer devices 322, 622, and 722 vary their heat transfer characteristics as a function of the temperature to which they are exposed. In operation in aircraft 100, starter/generator 216 may not always need cooling by heat transfer devices 322, 622, and 722. For example, when aircraft 100 is being flown, there may be sufficient airflow through the portion of aircraft in which starter/generator 216 is located that the temperature of starter/generator 216, and more specifically, it's cooling oil, is low enough that additional cooling from heat transfer devices 322, 622, and 722 is unnecessary. Thus, heat transfer devices 322, 622, and 722 may retract second pipe 332 so that it does not extend into the airstream around aircraft 100. When aircraft 100 is on the ground, operated at low speeds, or in particularly warm environments, however, there may not be sufficient cool airflow around starter/generator 216 to cool starter/generator 216. Second pipe 332 may then be extended to provide additional heat transfer and cooling for starter/generator 216.

The exemplary heat transfer devices described above are generally cylindrical in shape. The first pipes and second pipes of the exemplary heat transfer devices are each generally cylindrical in shape. In other embodiments, other shapes may be used including, oval cross-section cylindrical shapes, airfoil cross-section shapes, etc. First and second pipes of the exemplary heat transfer devices may comprise any material suitable for heat transfer as described herein. For example, first and second pipes may comprise stainless steel, copper, aluminum, etc. Moreover, the size, shape, length, working fluid, and other performance parameters may be selected to achieve a desired degree of heat transfer. In some embodiments, the second pipe grooves or fins to increase its surface area and thereby increase heat transfer from the second pipe. Such grooves and/or fins may extend longitudinally and/or circumferentially along the second pipe.

Figure 8:
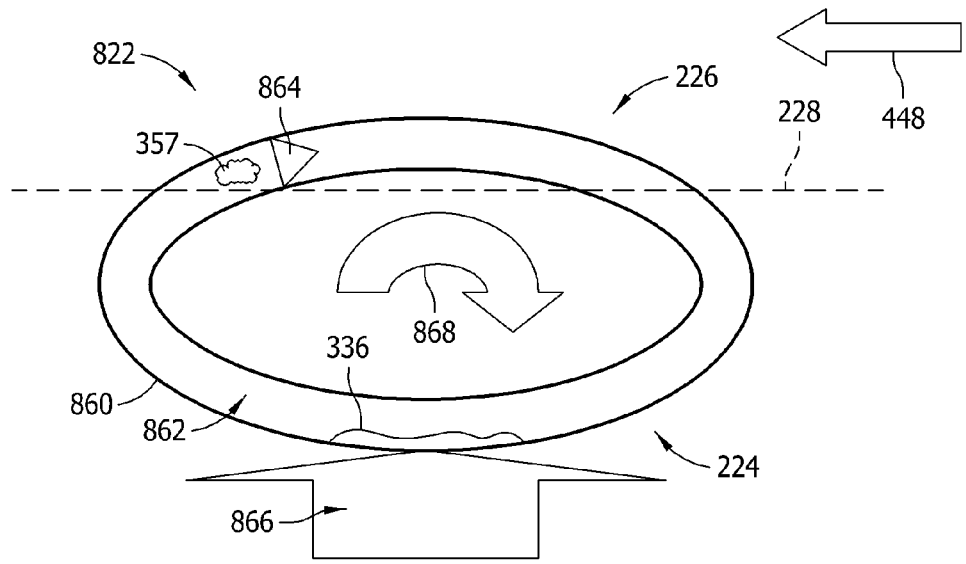
FIG. 8 is a cross-sectional view of an exemplary closed-loop heat transfer device.

FIG. 8 is a cross-sectional illustration of another exemplary heat transfer device 822. Heat transfer device 822 includes a single, closed-loop, thermally conductive pipe 860 defining a cavity 862. Working fluid 353 is contained within cavity 862. Heat transfer device 822 includes an orifice 864 for directing and/or controlling a flow of vaporized working fluid through heat transfer device 822.

In operation, heat 866 absorbed by hot portion 224 of heat transfer device 822 increases the temperature of working fluid 353 in cavity 862. The pressure in hot portion 224 increases and orifice 864 directs vapor 357 from hot portion 224 to the lower pressure cool portion 226, which is positioned outside aircraft 100. As heat is removed from vapor 357 in cool portion 226, the vaporized working fluid condenses in cool portion 226 and continues back to hot portion 224 to repeat the cycle. This results in a vapor flow through heat transfer device in direction 868.

As described above, thermally conductive pipe 860 forms a closed-loop. In the exemplary embodiment, thermally conductive pipe 860 is an elliptical shape (as viewed in FIG. 8). In other embodiments, thermally conductive pipe has other shapes including, for example, circular (which is a special case of an ellipse), linear approximations of elliptical shapes, rectangular, and combinations of curved and linear shapes.

In the exemplary embodiment, orifice 864 is a passive orifice. Orifice 864 is configured to direct vaporized working fluid in a single direction through thermally conductive pipe 860 as a result of increased pressure in hot portion 224. In the exemplary embodiment, orifice 864 is monolithically formed in thermally conductive pipe 860. For example, orifice 864 may be monolithically formed thermally conductive pipe 860 by crimping thermally conductive pipe 860 to create orifice 864. In other embodiments, orifice 864 may be formed separately and coupled within thermally conductive pipe 860.

In other embodiments, orifice 864 is an active orifice. For example, orifice 864 may be a controlled valve coupled within thermally conductive pipe 860. An active orifice 864 may permit additional control of the flow of vapor through thermally conductive pipe 860. By controlling active orifice 864, the timing of starting and stopping of vapor flow, and thereby cooling, may be controlled. Moreover the rate of vapor flow may be controlled by varying the extent to which orifice 864 is opened or closed. Thus, working fluid may be selected based more on desired characteristics other than characteristics such as boiling point, vapor pressure, etc. For example, a thicker working fluid may be selected to facilitate preventing leakage from heat transfer device 822.

Figure 9:
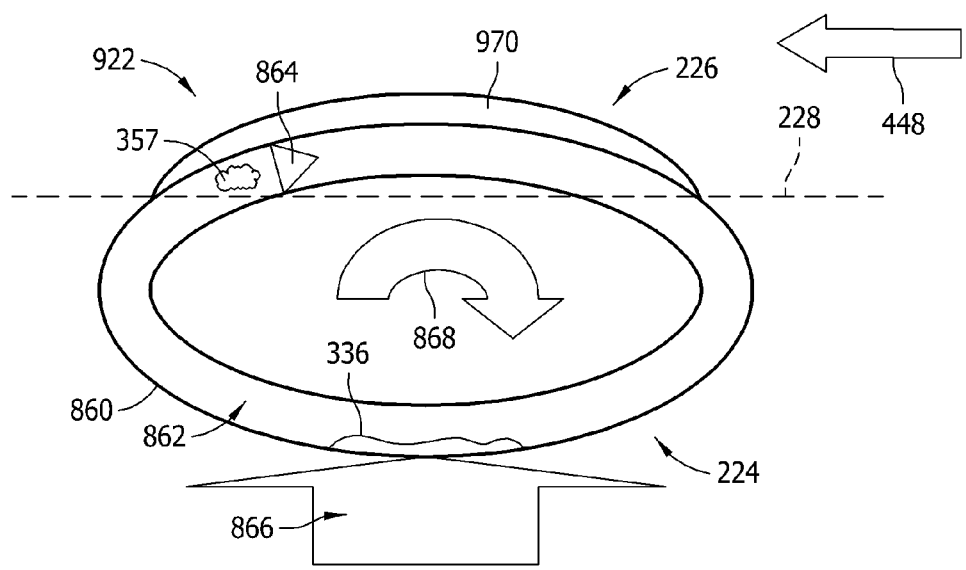
FIG. 9 is a cross-sectional view of another exemplary closed-loop heat transfer device.

FIG. 9 is a cross-sectional illustration of another exemplary heat transfer device 922. Heat transfer device 922 is identical to heat transfer device 822, but also includes a radiator fin 970 coupled to thermally conductive pipe 860 in the cool portion 226. Radiator fin 970 increases the surface area of heat transfer device 922 in cool portion 226, thereby increasing the heat dissipation by heat transfer device 922. The exemplary embodiment includes a single radiator fin 970. In other embodiments, more than one radiator fin 970 is coupled to thermally conductive pipe 860 in cool portion 226.

The above described heat transfer devices provide satisfactory heat transfer from starter/generators with less size, weight, and/or complexity than some known systems. This may simplify aircraft construction and/or design, improve the efficiency of aircraft, and/or reduce the cost of aircraft. Moreover, some embodiments provide automated variable heat transfer characteristics as a function of the temperature to which the heat transfer device is exposed. Further, some embodiments provide a retractable heat pipe that extends outside of the aircraft when cooling is needed and retracts within the aircraft when heat transfer via the heat transfer device is no needed. This provides good heat removal while reducing unnecessary drag when the heat transfer device is unneeded. Still other embodiments provide a fixed heat transfer device in which a portion of the heat transfer device remains external to the aircraft. Such embodiments are curved to maintain a smooth airflow across the aircraft and facilitate limiting drag on the aircraft.

Although described herein with respect to aircraft 100, the exemplary heat transfer devices (e.g., 222, 322, 622, 722, 822, and 922) may be used in connection with any heat generating, or hot, item. For example, the exemplary heat transfer devices may be used to transfer heat from hot items in a building, a vehicle, an electronic device, etc.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat transfer device comprising:
    a thermally conductive pipe having an interior cavity and an opening through said thermally conductive pipe to said interior cavity; and
    a heat transfer pipe disposed within said interior cavity, said thermally conductive pipe and said heat transfer pipe collaboratively defining a working fluid cavity for containing a working fluid, said heat transfer pipe slidably coupled to said thermally conductive pipe, said thermally conductive pipe and said heat transfer pipe collaboratively defining a length of said heat transfer device, wherein said heat transfer pipe is slidably movable between a first position at which the length of said heat transfer device is a minimum and a second position at which the length of said heat transfer device is a maximum, wherein substantially all of said heat transfer pipe is disposed within said interior cavity of said thermally conductive pipe in the first position and substantially all of said heat transfer pipe extends out of said thermally conductive pipe through the opening in the second position.

2. The heat transfer device in accordance with claim 1, wherein a heat convecting capability of said heat transfer device varies as a function of the length of said heat transfer device.

3. The heat transfer device in accordance with claim 1, further comprising a working fluid contained within the working fluid cavity.

4. The heat transfer device in accordance with claim 3, wherein said heat transfer pipe is configured to move between the first position and the second position as a function of a temperature of said thermally conductive pipe.

5. The heat transfer device in accordance with claim 4 wherein said heat transfer pipe is configured to move toward the second position as the temperature of said thermally conductive pipe increases to increase the length and a heat radiating capability of said heat transfer device.

6. The heat transfer device in accordance with claim 5 wherein said heat transfer pipe is configured to move between the first and second positions as a result of a variable pressure within the working fluid cavity.

7. The heat transfer device in accordance with claim 1 further comprising a rod coupled to said heat transfer pipe, the rod operable to move said heat transfer pipe between the first and second positions.

8. The heat transfer device in accordance with claim 7 wherein said rod is positioned within the cavity defined by said thermally conductive pipe and is operable as a wick.

9. The heat transfer device in accordance with claim 1, wherein said heat transfer element comprises a plurality of annular grooves in an exterior surface of said heat transfer pipe.

10. The heat transfer device in accordance with claim 1, further comprising a seal coupled between said thermally conductive pipe and said heat transfer pipe adjacent the opening through said thermally conductive pipe.

11. The heat transfer device in accordance with claim 1, further comprising a stop fixedly coupled to said heat transfer pipe to prevent movement of said heat transfer pipe beyond the second position at which substantially all of said heat transfer pipe extends out of said thermally conductive pipe through the opening.

12. The heat transfer device in accordance with claim 11, further comprising a complimentary stop coupled to said thermally conductive pipe and positioned to be contacted by said stop when said heat transfer pipe is in the second position.

13. The heat transfer device in accordance with claim 11, further comprising a seal coupled between said thermally conductive pipe and said heat transfer pipe adjacent the opening through said thermally conductive pipe, wherein said stop is configured to contact said seal when said heat transfer pipe is in the second position.

14. A heat transfer device for installation in a system having a heat generating element within the system away from which heat is to be transferred, said heat transfer device comprising:
a heat pipe comprising:
a stationary thermally conductive pipe disposed in proximity with the heat generating element, said thermally conductive pipe having an interior cavity and an opening through said thermally conductive pipe to said interior cavity;
a heat transfer pipe disposed within said interior cavity of said thermally conductive pipe, wherein said thermally conductive pipe and said heat transfer pipe collaboratively define a length of said heat pipe, said heat transfer pipe is slidably moveable through the opening between an extended position in which a portion of a surface area of said heat transfer pipe is exposed outside the system for heat transfer from said heat pipe and a retracted position in which the portion of the surface area is substantially within the system, wherein a working fluid cavity for containing a working fluid is collaboratively defined by said thermally conductive pipe and said heat transfer pipe; and
a working fluid contained within the working fluid cavity of said heat pipe for transferring heat from said thermally conductive pipe to said heat transfer pipe.

15. The heat transfer device in accordance with claim 14, further comprising a driving rod coupled to said heat transfer pipe to move said heat transfer pipe between the retracted and extended positions to vary heat transfer characteristics of said heat transfer device.

16. The heat transfer device in accordance with claim 14, wherein the thermally conductive pipe of said heat pipe is connected to an interior portion of an aircraft and the heat transfer pipe of said heat pipe is configured to extend outside the aircraft.

* * * * *